(12) United States Patent
Lindquist et al.

(10) Patent No.: US 10,547,964 B2
(45) Date of Patent: Jan. 28, 2020

(54) METHOD AND DEVICE FOR ESTIMATING ACCURACY OF A POSITION DETERMINATION

(71) Applicant: Combain Mobile AB, Lund (SE)

(72) Inventors: Björn Lindquist, Bjärred (SE); Rikard Windh, Lund (SE)

(73) Assignee: COMBAIN MOBILE AB, Lund (SE)

( * ) Notice: Subject to any disclaimer, the term of this patent is extended or adjusted under 35 U.S.C. 154(b) by 0 days.

(21) Appl. No.: 15/474,947

(22) Filed: Mar. 30, 2017

(65) Prior Publication Data

US 2017/0295463 A1    Oct. 12, 2017

(30) Foreign Application Priority Data

Apr. 12, 2016 (EP) .................................. 16164814

(51) Int. Cl.
| | |
|---|---|
| *H04W 4/021* | (2018.01) |
| *H04W 4/02* | (2018.01) |
| *H04B 17/318* | (2015.01) |
| *G01S 5/14* | (2006.01) |
| *G01S 5/02* | (2010.01) |

(52) U.S. Cl.
CPC ............ *H04W 4/021* (2013.01); *G01S 5/021* (2013.01); *G01S 5/14* (2013.01); *H04B 17/318* (2015.01); *H04W 4/023* (2013.01)

(58) Field of Classification Search
CPC ....... H04W 4/021; H04W 4/04; H04W 4/023; H04B 17/318; G01S 5/021; G01S 5/14
See application file for complete search history.

(56) References Cited

U.S. PATENT DOCUMENTS

| | | | |
|---|---|---|---|
| 7,548,731 B1* | 6/2009 | Anver ................... | G01S 5/021 342/125 |
| 7,856,234 B2 | 12/2010 | Alizadeh-Shabdiz et al. | |
| 2011/0021207 A1 | 1/2011 | Morgan et al. | |

(Continued)

OTHER PUBLICATIONS

Lemelson, Hendrik, et al. "Error estimation for indoor 802.11 location fingerprinting." *International Symposium on Location-and Context-Awareness*. Springer, Berlin, Heidelberg, 2009.

*Primary Examiner* — Muthuswamy G Manoharan
(74) *Attorney, Agent, or Firm* — Knobbe Martens Olson & Bear, LLP

(57) ABSTRACT

A method for estimating accuracy of a position determination based on distance-dependent measurements is disclosed. The method comprises: storing area information in relation to pre-defined geographical areas, wherein the area information for each pre-defined geographical area includes accuracy information relating to accuracy of position determinations based on distance-dependent measurements in the pre-defined geographical area; receiving a request for an accuracy estimate; determining an area affiliation based on received position information in said request, wherein the area affiliation defines at least one applicable geographical area among the pre-defined geographical areas, wherein the position of the receiving unit is located within the at least one applicable geographical area; and determining the accuracy estimate based on the stored area information for the at least one applicable geographical area.

12 Claims, 2 Drawing Sheets

(56) References Cited

U.S. PATENT DOCUMENTS

| | | | |
|---|---|---|---|
| 2013/0018826 A1* | 1/2013 | Sundararajan | H04L 12/6418 706/12 |
| 2013/0023282 A1* | 1/2013 | Lin | G01S 5/021 455/456.1 |
| 2015/0323646 A1* | 11/2015 | Lin | G01S 5/14 342/464 |

* cited by examiner

METHOD AND DEVICE FOR ESTIMATING ACCURACY OF A POSITION DETERMINATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The described technology relates, in general, to a method and a device for estimating accuracy of a position determination.

Description of the Related Art

A positioning system enables a mobile device to determine its position, and makes the position of the device available for position-based services such as navigating, tracking or monitoring, etc. Global Navigation Satellite System (GNSS), such as the Global Positioning System (GPS), is the most widely used positioning system and used in various devices such as smart phones, tracking equipment, etc. While providing very good and accurate outdoor location, there are some drawbacks with GPS. For small and low cost battery operated electronic devices, GPS requires extra hardware, is too expensive and draws too much power. GPS also cannot be deployed for indoor use, because the required close to line-of-sight transmission between receivers and satellites is not possible in an indoor environment.

There are a number of alternative technologies that may be used for positioning in indoor positioning systems (IPS) such as infrared (IR) radiation, ultrasound, radiofrequency identification (RFID), cell-id through a system for mobile communication such as Global System for Mobile communications (GSM), Wideband Code Division Multiple Access (WCDMA), Code Division Multiple Access (CDMA) or Long Term Evolution (LTE), wireless local area network (WLAN), e.g. Wi-Fi, Bluetooth, sensor networks, ultra-wideband (UWB), magnetic signals, vision analysis, audible sound and inertial sensors. Based on these fundamental technologies, numerous IPSs have been developed by different companies, research centers and universities. Each system takes advantage of a particular positioning technology or combining some of these technologies, which also inherits the limitations of these technologies. The designers make tradeoff between the overall performance and the complexity of the IPS s.

Looking at most of the current positioning techniques based on RF (Wi-Fi, Bluetooth, etc), they require a good knowledge of location of transmitters, also called beacons, and some model of an environment from a perspective of a signal used for communicating between transmitters and receivers, e.g. a radio frequency (RF) environment. The model of the environment may be based on fingerprints, i.e. mapping of detected signal strength throughout the environment, or a propagation model.

A common problem for all positioning systems is to estimate the positioning error, also called accuracy, for a positioning request. For GPS, the error depends on a lot of factors such as clock error, multipath, orbital errors, atmospheric delays, etc. One way to improve the GPS error is to use as many satellites as possible, thus as many location beacons as possible, to reduce the total noise and standard deviation of the errors.

A positioning request may comprise information of detected signal strengths of signals transmitted from a plurality of location beacons. For radio positioning systems such as cell-id or Wi-Fi positioning system, assuming the characteristics of location beacons (location, coverage area, output power, etc) are known, it is known that an error for a position determination for the positioning request could be estimated based on characteristics of the beacons used in the request.

In U.S. Pat. No. 7,856,234, it is disclosed that a method of estimating an expected error of a position estimate comprises estimating an expected error of the position estimate based on characteristics of the WLAN access point (AP) in range of a WLAN enabled device, wherein the error predicts a relative accuracy of the position estimate.

For example, if a single Wi-Fi beacon that has a coverage area with a 100 m radius is sensed by a receiving Wi-Fi device that wants to be positioned, the maximum positioning error is 200 m and the median positioning error is about 100 m. But this implies that the position and characteristics of the Wi-Fi beacon is well known and accurate. To achieve a good error estimate with this method, a high quality database with position of all location beacons and their characteristics is required. Thus this method works well in few buildings where manual input/calibration of the Wi-Fi APs has been made or in larger areas where so called war driving is made to measure Wi-Fi APs accurately.

Information about location beacons may be collected through a crowd-sourced scheme, which implies that a provider of the positioning technology does not need to make measurements throughout the area in which position determinations are to be performed. However, quality of the collected information, such as estimates of beacon locations and characteristics of beacons may vary a lot, when collected through a crowd-sourced scheme. Information collected in a crowd-sourced scheme is not well controlled. For instance, a quality of a device for collecting information, such as receiver sensitivity and antenna gain, may vary extensively and may be unknown. Further, in some areas a huge number of data points may be collected, whereas in other areas very few data points may be collected. Thus, some beacons may be well characterized if a lot of data around the beacon is collected and some beacons may have a huge location error, or uncertainty, if only a few data points in a limited area have been collected. Thus it is very hard to do an accurate estimate of a positioning error based on only characteristics of some of the beacons.

SUMMARY

It is an object of the described technology to provide a method and device for estimating accuracy of a position determination, which is suitable for use with information collected through crowd-sourcing. It is another object of the described technology that the accuracy estimation is not directly dependent on quality of information on the characteristics of a transmitter.

These and other objects of the described technology are at least partly met by the described technology as defined in the independent claims. Preferred embodiments are set out in the dependent claims.

According to a first aspect of the described technology, there is provided a method for estimating accuracy of a position determination based on distance-dependent measurements, wherein each of said distance-dependent measurements provides distance information relating to a distance between a position of a receiving unit and a position of a transmitter, wherein the transmitter is arranged to transmit a signal which is received by the receiving unit and said distance-dependent measurement is based on the received signal, said method comprising: storing area information in relation to pre-defined geographical areas, wherein the area information for each pre-defined geographical area includes accuracy information relating to accuracy of position determinations based on distance-dependent measurements in the pre-defined geographical area; receiving a request for an accuracy estimate, said request comprising position information relating to a position of a receiving unit; determining an area affiliation based on the received position information in said request, wherein the area affiliation defines at least one applicable geographical area among the pre-defined geographical areas, wherein the position of the receiving unit is located within the at least one applicable geographical area; and determining the accuracy estimate based on the stored area information for the at least one applicable geographical area.

According to a second aspect of the described technology, there is provided a computer program product comprising a computer-readable medium with computer-readable instructions such that when executed on a processing unit the computer program product will cause the processing unit to perform the method according to the first aspect.

According to a third aspect of the described technology, there is provided a device for estimating accuracy of a position determination based on distance-dependent measurements, wherein each of said distance-dependent measurements provides distance information relating to a distance between a position of a receiving unit and a position of a transmitter, wherein the transmitter is arranged to transmit a signal which is received by the receiving unit and said distance-dependent measurement is based on the received signal, said device comprising: a memory for storing area information in relation to pre-defined geographical areas, wherein the area information for each pre-defined geographical area includes accuracy information relating to accuracy of position determinations based on distance-dependent measurements in the pre-defined geographical area; and a processing unit, said processing unit being arranged to receive a request for an accuracy estimate, said request comprising position information relating to a position of a receiving unit, said processing unit being further arranged to determine an area affiliation based on the received position information in said request, wherein the area affiliation defines at least one applicable geographical area among the pre-defined geographical areas, wherein the position of the receiving unit is located within the at least one applicable geographical area; and said processing unit being further arranged to determine the accuracy estimate based on the stored area information for the at least one applicable geographical area.

Thanks to the described technology, an accuracy estimate of a position determination is associated with a geographical area. This implies that locations of the transmitters need not be very accurately pre-determined in order for the accuracy estimate to be valid, as the accuracy estimate is not directly and solely dependent on characteristics of the transmitter(s).

By means of using pre-defined geographical areas, the accuracy estimate may also be calculated in different manners for different areas. A suitable manner of calculating the accuracy estimate may depend on the information available.

Since different types of information may be available for different areas, it may be advantageous to calculate the accuracy estimate differently for different areas.

The accuracy estimate may be pre-calculated for respective geographical areas. Thus, the pre-calculated accuracy estimate may be stored, and determining of the accuracy estimate based on the stored area information may be include fetching the stored, pre-calculated accuracy estimate.

The position information in the request may be an actual position that has already been determined based on distance-dependent measurements. However, it should be realized that the position information may alternatively be information that allows determining of a position, such as measurement values from distance-dependent measurements.

As used herein, the term "distance-dependent measurement" should be construed as a measurement that gives some indication of a distance, even though it may not measure the distance directly. Rather, the measured quantity may be a quantity that is dependent on distance in some way. The measured quantity need not even be directly proportional to the distance and may even be non-linearly related to the distance. As further described below, the distance measurement may e.g. be based on a received power of a signal, i.e. a signal strength, or be based on a time of travel of a signal between a source and a receiving unit.

According to an embodiment, the request may also comprise transmitter information based on signals received by the receiving unit. In addition to using the stored area information, the transmitter information may also be used in determining the accuracy estimate.

The stored area information may provide a simple manner of accessing accuracy information, which may be apply generally to accuracy of position determinations within the pre-defined geographical area with which the accuracy information is associated. However, by also using transmitter information, the general accuracy information may be complemented with specific information applying to positioning of a specific receiving unit so that an accuracy estimate may be provided which relates to the actual positioning being performed.

The transmitter information may be information relating to a number of transmitters from which signals are received by the receiving unit. The transmitter information may be information relating to a strength of a signal received from a transmitter, which signal strength may simultaneously provide an indication of a distance between the transmitter and the receiving unit. The transmitter information may be any kind of information indicating a distance between a transmitter and the receiving unit.

The transmitter information may include information relating to each transmitter from which signals are received by the receiving unit. The transmitter information may alternatively or additionally include information relating to an average parameter, such as average distance or signal strength, relating the transmitter to the receiving unit.

According to an embodiment, the determining of the accuracy estimate comprises accessing a pre-calculated accuracy estimate for the at least one applicable geographical area. Thus, the accuracy estimate may be quickly determined, since the determination may involve merely a look-up in a table in order to obtain a pre-calculated accuracy estimate.

Thanks to the described technology, an accuracy estimate of a position determination is associated with a geographical area. This implies that locations of the transmitters need not be very accurately pre-determined in order for the accuracy estimate to be valid, as the accuracy estimate is not directly and solely dependent on characteristics of the transmitter(s).

By means of using pre-defined geographical areas, the accuracy estimate may also be calculated in different manners for different areas. A suitable manner of calculating the accuracy estimate may depend on the information available. Since different types of information may be available for different areas, it may be advantageous to calculate the accuracy estimate differently for different areas.

The accuracy estimate may be pre-calculated for respective geographical areas. Thus, the pre-calculated accuracy estimate may be stored, and determining of the accuracy estimate based on the stored area information may be include fetching the stored, pre-calculated accuracy estimate.

The position information in the request may be an actual position that has already been determined based on distance-dependent measurements. However, it should be realized that the position information may alternatively be information that allows determining of a position, such as measurement values from distance-dependent measurements.

As used herein, the term "distance-dependent measurement" should be construed as a measurement that gives some indication of a distance, even though it may not measure the distance directly. Rather, the measured quantity may be a quantity that is dependent on distance in some way. The measured quantity need not even be directly proportional to the distance and may even be non-linearly related to the distance. As further described below, the distance measurement may e.g. be based on a received power of a signal, i.e. a signal strength, or be based on a time of travel of a signal between a source and a receiving unit.

According to an embodiment, the request may also comprise transmitter information based on signals received by the receiving unit. In addition to using the stored area information, the transmitter information may also be used in determining the accuracy estimate.

The stored area information may provide a simple manner of accessing accuracy information, which may be apply generally to accuracy of position determinations within the pre-defined geographical area with which the accuracy information is associated. However, by also using transmitter information, the general accuracy information may be complemented with specific information applying to positioning of a specific receiving unit so that an accuracy estimate may be provided which relates to the actual positioning being performed.

The transmitter information may be information relating to a number of transmitters from which signals are received by the receiving unit. The transmitter information may be information relating to a strength of a signal received from a transmitter, which signal strength may simultaneously provide an indication of a distance between the transmitter and the receiving unit. The transmitter information may be any kind of information indicating a distance between a transmitter and the receiving unit.

The transmitter information may include information relating to each transmitter from which signals are received by the receiving unit. The transmitter information may alternatively or additionally include information relating to an average parameter, such as average distance or signal strength, relating the transmitter to the receiving unit.

According to an embodiment, the determining of the accuracy estimate comprises accessing a pre-calculated accuracy estimate for the at least one applicable geographical area. Thus, the accuracy estimate may be quickly determined, since the determination may involve merely a look-up in a table in order to obtain a pre-calculated accuracy estimate.

According to another embodiment, the accuracy information comprises a measure of an average number of transmitters detected by receiving units located in the pre-defined geographical area. Such measure of an average number of transmitters detected may be compared to information in the request regarding a number of transmitters detected for the present position determination. Thus, the pre-calculated accuracy estimate may be adapted to the information on which the position determination is based.

The measure of the average number of transmitters detected may also be used for estimating if an update should be performed to the pre-defined geographical areas. For instance, the pre-defined geographical areas may be updated such that the average number of transmitters is constant or fairly constant throughout each pre-defined geographical area.

According to another embodiment, the accuracy information may comprise information allowing the accuracy estimate to be calculated when a request received.

According to one embodiment, the accuracy information comprises a measure of an actual positioning error in the pre-defined geographical area. The measure of the actual positioning error may provide a direct value to be used as the accuracy estimate for the geographical area. The measure may for instance be an average or a median of a measured actual positioning error in the geographical area.

According to another embodiment, the accuracy information comprises a measure of density of transmitters in the pre-defined geographical area. For instance, if the density of transmitters is high, the position determination will be very accurate.

The accuracy information may also comprise a model of a positioning error in the pre-defined geographical area. Different models for the positioning error may be used for different types of geographical areas (e.g. urban, residential, rural, etc).

According to another embodiment, the accuracy information comprises a measure of a location accuracy of transmitters in the pre-defined geographical area. The accuracy estimate may be highly dependent on the location accuracy of transmitters. Further, the location accuracy of different transmitters may differ when locations of transmitters are determined based on crowd-sourced information, since the crowd-sourced information may not be of equal quality for different transmitters. Also, the location accuracy may differ substantially between transmitters for which a location is determined with manual calibration and transmitters for which a location is determined based on crowd-sourced information.

According to another embodiment, the accuracy information comprises attenuation information relating to attenuation of signals transmitted by transmitters in the pre-defined geographical area. The attenuation information is a characteristic of the environment in the pre-defined geographical area. If the attenuation is large, a signal transmitted by the transmitter will be extinguished in a short distance. Hence, the transmitter has a small coverage radius and thanks to a small size of the coverage radius, a positioning error will be small (assuming the location accuracy of the transmitter is good).

It should be realized that the accuracy information may comprise information of one or more of the above-mentioned types. The accuracy estimate may then be determined based on the accuracy information at hand.

The determining of the accuracy estimate may comprise calculating the accuracy estimate based on the stored area information for the at least one applicable geographical area. Thus, the accuracy estimate may be calculated upon receiving a request. The stored area information may be gradually improved, by collecting of further information. By means of calculating of the accuracy estimate upon receiving a request, it is possible to make use of all information that has been collected before receiving the request, not only information on which a pre-calculated accuracy estimate was based.

According to an embodiment, the transmitter information defines a number of transmitters from which signals are received by the receiving unit and a distance-dependent measurement is based on the received signal. Thanks to the request comprising transmitter information, the accuracy estimate may be dependent on actual measurements performed in order to perform the position determination. Hence, the accuracy estimate is not only a measure of an average positioning error within the pre-defined geographical area, but may also be related to the specific position determination to which the accuracy estimate is related.

The pre-defined geographical areas may be partially overlapping. For instance, the pre-defined geographical areas may divide a region (or even the entire world) into areas of equal sizes. However, specific geographical areas may also be pre-defined within such a regular pattern, e.g. corresponding to a building. Such specific geographical areas may thus overlap with one or more of the pre-defined geographical areas in the regular pattern. In such manner, there may be a plurality of applicable geographical areas for a specific position.

According to an embodiment, the area affiliation defines more than one applicable geographical area and said determining of the accuracy estimate includes determining a partial accuracy estimate for each of the more than one applicable geographical areas and selecting a smallest partial accuracy estimate as said accuracy estimate. By selecting the smallest partial accuracy estimate, the accuracy of the position determination will not be worse than the determined accuracy estimate.

According to another embodiment, the area affiliation defines more than one applicable geographical area and said determining of the accuracy estimate includes determining a partial accuracy estimate for each of the more than one applicable geographical areas and determining said accuracy estimate as a weighted average of the partial accuracy estimates. Using a weighted average may be more complicated than merely selecting the smallest partial accuracy estimate. On the other hand, the determined accuracy estimate may be closer to an actual accuracy of the position determination.

According to an embodiment, the method further comprises transmitting, in response to said request, a position of the receiving unit determined based on the position information and said accuracy estimate. Hence, the position of the receiving unit and the accuracy estimate is provided as a response. This may thus be used by the requesting entity in any application that needs a position of the receiving unit.

An accuracy estimate may conventionally merely be considered in a horizontal plane. Thus, the accuracy estimate may be given as a measure of a reliability of a position determination in terms of a horizontal position (latitude and longitude). However, according to a specific object of the described technology, accuracy is to be estimated also in a vertical plane, e.g. providing an accuracy of a determination of an altitude of the position determination or a floor in a building.

According to an embodiment, the determining of an accuracy estimate comprises determining a horizontal accuracy estimate and a vertical accuracy estimate. Thus, accuracy estimates may be provided in both respects.

The above embodiments are considered mainly from a point of view of providing a horizontal accuracy estimate. However, a vertical accuracy estimate may be provided in a similar manner. The vertical accuracy estimate may be especially important for indoor position determinations, i.e. determining positions inside buildings.

The vertical position of the receiving unit may be determined in relation to vertical positions of the transmitters from which signals are received by the receiving unit. For instance, if a majority of the transmitters from which signals are received are located on a specific floor of the building, the receiving unit may likely be on the same floor. The vertical accuracy estimate may be determined as generally described above for accuracy estimates based on e.g. pre-calculated accuracy estimates for the at least one applicable geographical area or by calculating the accuracy estimate based on the stored area information.

According to an embodiment, the vertical accuracy estimate may be provided as a likelihood that the receiving unit is located on a specific floor in a building or within a specific interval of altitudes.

The pre-defined geographical area may also be further divided into a plurality of portions, corresponding to different altitudes. Each portion of the pre-defined geographical area may e.g. correspond to a floor in a building. Based on a vertical position determination, the corresponding portion of the pre-defined geographical area may be selected and the horizontal accuracy estimate may be determined based on stored information in relation to the selected portion.

BRIEF DESCRIPTION OF THE DRAWINGS

These and other aspects of the present described technology will now be described in further detail, with reference to the appended drawings showing embodiment(s) of the described technology.

DETAILED DESCRIPTION OF THE CERTAIN INVENTIVE EMBODIMENTS

In cooperation with attached drawings, the technical contents and detailed description are described hereinafter according to a preferable embodiment, being not used to limit the claimed scope of protection. This described technology may be embodied in many different forms and should not be construed as limited to the embodiments set forth herein; rather, these embodiments are provided for thoroughness and completeness, and fully convey the scope of the described technology to the skilled person.

Reference will now be made to the drawings to describe the described technology in detail.

Figure 1:
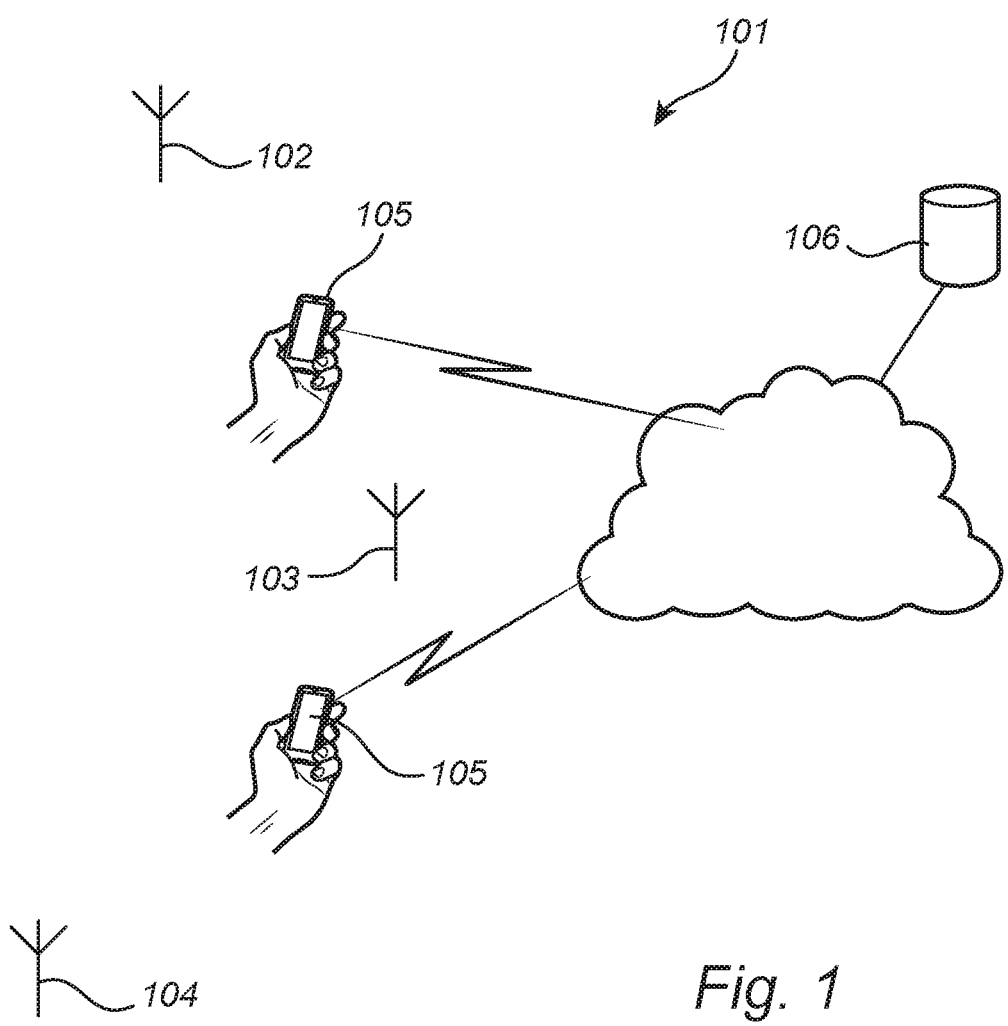
FIG. 1 is a schematic view of an environment comprising transmitters and receiving units.

Referring to FIG. 1, there is shown an environment 101 with sources in form of transmitters 102-104. The transmitters 102-104 may transmit RF signals, but it should also be realized that another type of signal may be transmitted, such as an ultrasound signal, or an infrared, or other lightwave, radiation signal. The transmitters 102-104 may for instance be Wi-Fi APs or Bluetooth low energy (BLE) beacons.

The environment 101 is here assumed to be mostly indoor, but could be outdoor or indoor or a combination of the two. There are one or more receiving units 105 in the form of electronic devices that measure received signal strength (RSS) from each of the transmitters 102-104 in measurement positions.

The receiving units 105 may be any type of unit that may receive the signals transmitted from at least some of the transmitters 102-104. The receiving units 105 may thus for instance be mobile phones, personal digital assistants (PDAs), tablet computers, or laptops.

The electronic devices need not necessarily measure RSS. An alternative quantity, which is distance-dependent, may alternatively be measured. The measure will provide an indication of a distance between the transmitter 102-104 and the receiving unit 105. For instance, a time of flight measurement of signals between the transmitter 102-104 and the receiving unit 105 may be used. Thus, a round trip time (RTT), which is a length of time it takes for a signal to be sent plus a length of time it takes for an acknowledgment of that signal to be received, may be measured. Alternatively, a time of arrival (TOA) measurement of a signal or time delay of arrival (TDOA) measurements of signals may be acquired.

Locations of the transmitters 102-104 may be known and stored in a database. The locations may be known by means of using several different methods. Thus, the locations of all transmitters 102-104 need not be determined in the same manner.

Locations of transmitters 102-104 may be determined by manual calibration or manual input. For instance, a provider of a transmitter 102-104, such as an administrator that installs a Wi-Fi AP may provide manual information on where the transmitter 102-104 has been placed.

Alternatively, locations of transmitters 102-104 may be determined by organized collection of information about transmitters 102-104, for instance, using so-called war driving. The signals transmitted by transmitters 102-104 may thus be collected using well-calibrated equipment such that the locations of the transmitters 102-104 may be determined in an accurate manner.

As a further alternative, information of signals from transmitters 102-104 may be collected using a crowd-sourced scheme. Thus, a huge number of people may collectively collect a lot of data, using their receiving units 105, such as mobile phones. The crowd-sourced information may thus include a large number of data points indicating e.g. signal strengths from transmitters 102-104. The large number of data points may thus be used for determining the locations of the transmitters 102-104, at least providing relative positions of the transmitters 102-104 to each other. A plurality of global position indications, such as GPS positions, may be used for providing absolute locations of the transmitters 102-104.

If a crowd-sourced scheme is used, further data points may be continuously collected. These further data points may be used for updating the locations of the transmitters 102-104 for improving a location accuracy of the transmitters 102-104.

The collected information may be stored in a database 106. The database 106 may store information on locations of transmitters 102-104, as mentioned above. The locations of the transmitters 102-104 may be used together with distance-dependent measurements acquired by the receiving unit 105 for making a position determination of the receiving unit 105.

Figure 2:
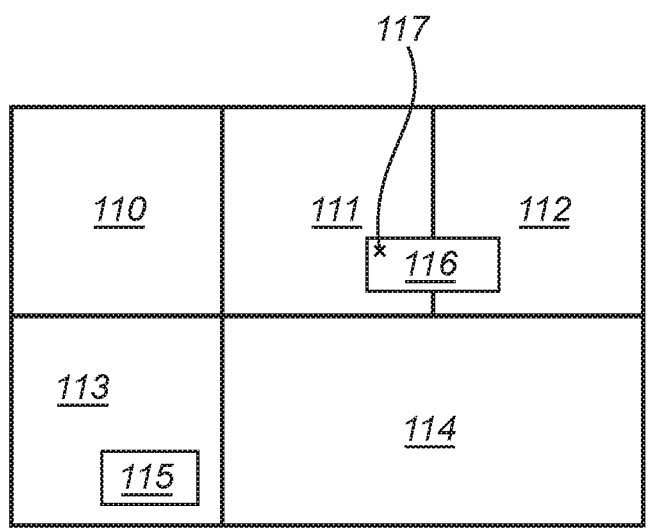
FIG. 2 is a schematic view of a division of the environment into pre-defined geographical areas.

Referring now to FIG. 2, the environment 101 may be divided into a plurality of pre-defined geographical areas 110-116. A pre-defined geographical area 110-116 may be defined as a geographic tile 110-114, e.g. by latitude and longitude coordinates of opposing corners of the tile. The entire environment 101, such as the entire world, a country, or a region, may be divided into geographic tiles 110-114 of similar or identical sizes, Some geographic tiles 110-114 may have different sizes, e.g. depending on the number of transmitters 102-104 within the tile 110-114 or a size of an area having a constant accuracy of position determinations.

A pre-defined geographical area 115-116 may alternatively be defined as a city, or a building, for example a shopping mall. The pre-defined geographical area 115-116 may be a highrise with many floors or even a single floor within the highrise. The pre-defined geographical areas 110-116 may overlap. For example, a pre-defined geographical area 115-116 corresponding to a building may be defined within a regular pattern of geographic tiles 110-114, such that the area 115-116 corresponding to the building may, for instance, be completely within a single geographic tile 110-114 or may partly overlap with two or more geographic tiles 110-114.

The database 106 may further store information in relation to the pre-defined geographical areas 110-116. Thus, the stored information may be associated with respective pre-defined geographical areas 110-116. The stored information may allow calculating an accuracy estimate of position determinations within the pre-defined geographical area 110-116.

The accuracy estimate may be pre-calculated, such that a value of the pre-calculated accuracy estimate may be directly stored in the database 106. Alternatively, the database 106 may store information such that the accuracy estimate may be calculated based on the stored information. Thus, further data points improving the calculation of the accuracy estimate may be continuously provided to the database 106, such that the accuracy estimate may always be calculated based on all available information. This may be particularly useful when crowd-sourced information is provided to the database 106.

The accuracy estimate may be an indication of a positioning error of the position determination. For instance, a median positioning error, an average positioning error, or a standard deviation, such as a 2-sigma standard deviation, of the positioning error, may be calculated. It should however be realized that the accuracy estimate may be provided in several different manners. For instance, the accuracy estimate may be an indication of a likelihood that a location of a receiving unit 105 is within a pre-set radius from the determined position.

A positioning error for the pre-defined geographical area 110-116 may be calculated in a number of different ways, as will be indicated below. These ways may be combined in any manner or may be used individually. The way of calculating the positioning error may vary between different pre-defined geographical areas, e.g. depending on the type of information available for the respective pre-defined geographical areas.

1) Measured actual positioning error. For example, manual measurements indoors inside a building or based on crowd-sourced GPS positions providing reference measurements for positioning outdoors.
2) A density of transmitters 102-104 in combination with a model of positioning error. The more transmitters 102-104, the higher density and the lower positioning error. Depending on the area type (urban, residential, rural, inside a building, etc) different models can be used.
3) The average number of transmitters 102-104 seen from different crowd-sourced locations within the pre-defined geographical area 110-116. This is similar to transmitter density, but can also be used for estimating if the pre-defined geographical area 110-116 is correctly chosen. For instance, if a standard deviation of measured number of transmitters 102-104 within the pre-defined geographical area 110-116 is high, it may be an indication that the area may need to be more finely divided.
4) The location accuracy of the transmitters 102-104 within the area. If the positions of the transmitters 102-104 are known accurately, such as when doing a manual calibration of locations of transmitters 102-104, the error is lower compared to using crowd-sourced estimated locations of transmitters 102-104. For locations of transmitters 102-104 determined by crowd-sourced information, the location accuracy could be estimated by evaluating how many data points are available, variation in radio signal strength (RSS) and their geographic spread. Many measurements where some measurements are strong and some weak over a large area will give a much more accurate location of the transmitter 102-104 than just a few measurements.
5) The radio environment 101, which could also be seen as the average attenuation for the signals from the transmitters 102-105 within the area. A building with thick walls will have a high radio attenuation factor and thus a smaller coverage radius for the transmitters 102-104. This building will have a smaller positioning error thanks to the smaller size of the coverage for the transmitter 102-104, assuming the location accuracy of the transmitter 102-104 is good.
6) The distance-dependent measurements made in the area. If few measurements are close to the transmitter, the location accuracy estimate may be larger than if there are many distance-dependent measurements that are close to the transmitters.

It may be noted that a method of determining a positioning error using the above types of information works particularly well for wireless standards like Wi-Fi, where characteristics of the transmitters 102-104 are well-known. For instance, output power is specified to maximum 20 dBm (0.1 W) for Wi-Fi transmitters. Then, the error is mainly depending on the location accuracy of the transmitters 102-104 and the environment 101, in which the transmitters 102-104 are placed. The same applies for Bluetooth beacons that are being used for location. For these, beacon output power is part of a broadcasted message and thereby known by the receiving unit 105.

A position determination may be made within a plurality of pre-defined geographical areas. As indicated by position 117, a plurality of geographical areas 111 and 114 may apply to the position 117.

Then, the positioning error may be determined as a lowest calculated positioning error for the plurality of geographical areas. This may be correct, since it may be assumed that a low positioning error will be applicable, when a plurality of areas is overlapping. For instance, if the positioning error in a specific geographical area 115-116 would not be lower than in the tile 110-114, the specific geographical area 115-116 may not be pre-defined in the environment 101.

However, it should be realized that it is not necessarily the lowest calculated positioning error that applies. An alternative may be to use the calculated positioning error for the geographical area having smallest size among the plurality of geographical areas, since it may be assumed that such geographical area applies to the present position determination.

As a further alternative, a weighted average positioning error in the plurality of applicable areas 111, 114 may be used for determining the positioning error for the position 117.

A manner of determining the positioning error when the position determination is within a plurality of pre-defined geographical areas may also differ between different parts of the environment 101.

According to an embodiment, the position determination may include a vertical position of the receiving unit 105. The vertical position may be provided as an altitude and/or a floor level in a building.

Similarly, as described above in relation to horizontal positions, a vertical accuracy estimate may be determined for the position determination. Thus, the database 106 may store information in relation to the pre-defined geographical areas for allowing a vertical accuracy estimate to be determined. Such information need not necessarily be stored for every pre-defined geographical area, but may for instance only be stored for pre-defined geographical areas where it may be relevant, e.g. in relation to pre-defined geographical areas comprising highrise(s).

The accuracy estimate may be an indication of a positioning error of the position determination. For instance, a median positioning error, an average positioning error, or a standard deviation, such as a 2-sigma standard deviation, of the positioning error, may be calculated. It should however be realized that the accuracy estimate may be provided in several different manners. For instance, the accuracy estimate may be an indication of a likelihood that a location of a receiving unit 105 is within a pre-set altitude interval from the determined position or a likelihood that a location of the receiving unit 105 is on a specific floor of a building.

Figure 3:
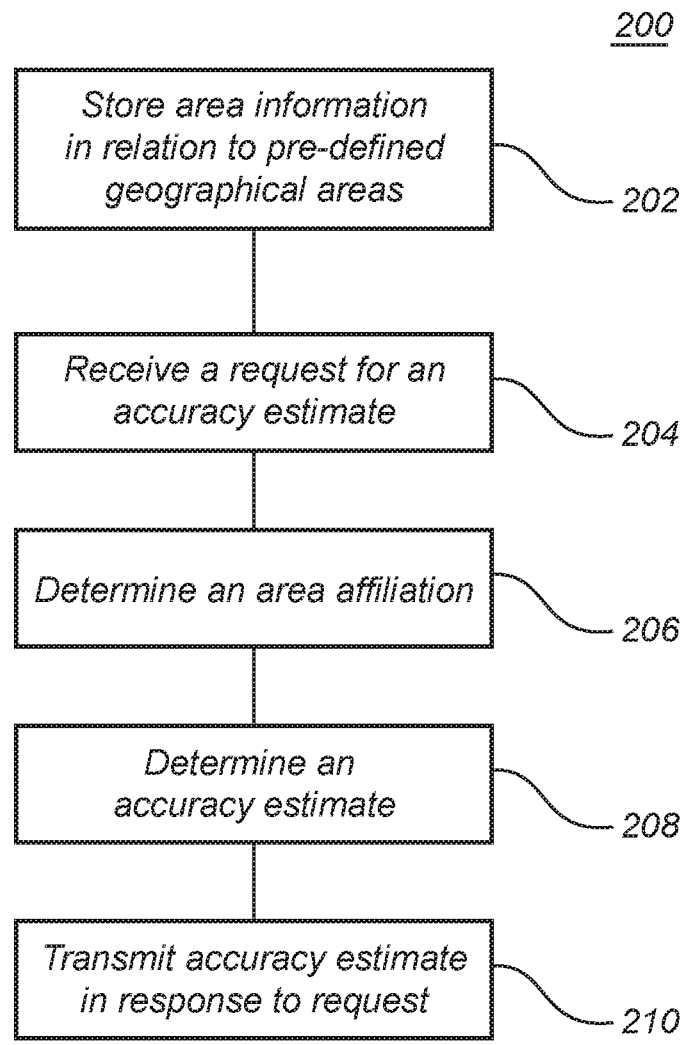
FIG. 3 is a flow chart illustrating a method for determining an accuracy estimate according to an embodiment of the described technology.

Referring now to FIG. 3, a method 200 for estimating accuracy of a position determination will be described.

The method comprises storing, step 202, area information in relation to pre-defined geographical areas 110-116. The area information includes accuracy information relating to accuracy of position determinations based on distance-dependent measurements in the pre-defined geographical area 110-116.

The method further comprises receiving, step 204, a request for an accuracy estimate. The request may be transmitted from a receiving unit 105. In such case, the receiving unit 105 may transmit position information allowing a position of the receiving unit 105 to be determined. For instance, the request may include distance-dependent measurements acquired by the receiving unit 105, such as RSS of a plurality of signals from transmitters 102-104 received by the receiving unit 105.

The request may alternatively be transmitted by a unit which makes position determinations, such as a server or base station with which the receiving unit 105 communicates. The unit may perform the position determination based on information received from the receiving unit 105. The request may thus merely include an actual position of the receiving unit 105 as determined.

If the request does not comprise the actual position of the receiving unit 105, the position may first be determined. The position determination may be performed by the unit receiving the request. Alternatively, a further request for making the position determination may be transmitted and, once the position has been determined, the determined position may be received in return.

Once the position of the receiving unit is determined, an area affiliation may be determined, step 206. The position of the receiving unit 105 is thus compared to the pre-defined geographical areas 110-116 and the pre-defined geographical area or areas in which the position of the receiving unit 105 is located are determined. The area affiliation thus defines one or more applicable geographical areas.

The accuracy estimate may then be determined, step 208, based on the stored area information for the one or more applicable geographical areas. The accuracy estimate may be determined using any of the types of information as defined above for calculating the accuracy estimate in real time. Alternatively, the accuracy estimate may be determined by a table look-up of a pre-calculated and stored accuracy estimate.

As mentioned above, the request may include transmitter information defining a number of transmitters 102-104 from which signals are received by the receiving unit 105. The transmitter information may be provided in the form of a number of distance-dependent measurements, which thus indicate the number of transmitters 102-104 from which signals are received.

The accuracy estimate may be determined for the specific request, such that the accuracy estimate is not merely dependent on the stored information for the pre-defined geographical area 110-116. The positioning error within a pre-defined geographical area 110-116 may be based on an average density of transmitters 102-104 within the area or an average number of transmitters 102-104 from which signals are received by receiving units 105 in the area. However, if the number of transmitters 102-104 from which signals are received by the receiving unit 105 in the specific request differs from the average, the positioning error will also differ. This may be used for determining an accuracy estimate that is specific to the request and is based on the transmitter information in the request.

According to one example, the positioning error may be calculated using the following formula:

Positioning error=(Pre-calculated error for the pre-defined geographical area)*square root((Average number of transmitters from which signals are received in the area)/(Number of transmitters in request))

As mentioned above, the determined positioning error may also take into account the specific information of the distance-dependent measurements made in the area. The number of distance-dependent measurements made and the closeness of the receiving unit 105 to the transmitters 102-104 may be considered. For instance, if few measurements are close to the transmitter, the location accuracy estimate may be larger than if there are many distance-dependent measurements that are close to the transmitters.

Similarly, an example of estimating probability that the position is on a certain floor of a building may be calculated using the following formula:

Probability on correct floor=(Pre-calculated average for correct floor probability)^((Average number of transmitters from which signals are received in the area)/(Number of transmitters in request))

As realized by a person skilled in the art, the above are just two examples of formulas that may be used and many other types of formulas could be used.

The accuracy estimate may be transmitted, step 210, in response to the request. The accuracy estimate may be transmitted together with a position as determined for the receiving unit 105.

According to an example, four pre-defined geographical areas may be provided, wherein Area1 corresponds to the entire world, Area2 corresponds to the San Francisco bay area, Area3 corresponds to San Francisco downtown, and Area4 corresponds to a specific store in San Francisco downtown.

The database 106 may store information in relation to each area as specified in Table 1:

TABLE 1

Example of stored information in relation to pre-defined geographical areas

| Area | Measured median positioning error | Measured average number of transmitters from which signals are received | Measured average correct floor probability |
|---|---|---|---|
| Area1 | 40 m | 3 | N/A |
| Area2 | 30 m | 7 | N/A |
| Area3 | 20 m | 15 | N/A |
| Area4 | 10 m | 10 | 85% |

If a request for an accuracy estimate corresponds to a position in Area1 with received signals from 3 transmitters, a calculated accuracy estimate will be $40*(3/3)^{0.5}=40$ m.

If a request for an accuracy estimate corresponds to a position in Area1 with received signals from 2 transmitters, a calculated accuracy estimate will be $40*(3/2)^{0.5}=49$ m.

If a request for an accuracy estimate corresponds to a position in Area1 with received signals from 1 transmitter, a calculated accuracy estimate will be $40*(3/1)^{0.5}=69$ m.

If a request for an accuracy estimate corresponds to a position in Area1 with received signals from more than 9 transmitters, a calculated accuracy estimate will be $40*(3/9)^{0.5}=23$ m.

If a request for an accuracy estimate corresponds to a position in Area2 with received signals from 7 transmitters, a calculated accuracy estimate will be $30*(7/7)^{0.5}=30$ m.

If a request for an accuracy estimate corresponds to a position in Area2 with received signals from 3 transmitters, a calculated accuracy estimate will be $30*(7/3)^{0.5}=46$ m.

If a request for an accuracy estimate corresponds to a position in Area2 with received signals from more than 21 transmitters, a calculated accuracy estimate will be $30*(7/21)^{0.5}=17$ m.

If a request for an accuracy estimate corresponds to a position in Area3 with received signals from 15 transmitters, a calculated accuracy estimate will be $20*(15/15)^{0.5}=20$ m.

If a request for an accuracy estimate corresponds to a position in Area3 with received signals from 7 transmitters, a calculated accuracy estimate will be $20*(15/7)^{0.5}=29$ m.

If a request for an accuracy estimate corresponds to a position in Area4 with received signals from 10 transmitters, a calculated accuracy estimate will be $10*(10/10)^{0.5}=10$ m and a provided floor probability is $0.85^{(10/10)}=85\%$.

If a request for an accuracy estimate corresponds to a position in Area4 with received signals from 15 transmitters, a calculated accuracy estimate will be $10*(10/15)^{0.5}=8$ m and a provided floor probability is $0.85^{\wedge}(10/15)=90\%$.

If a request for an accuracy estimate corresponds to a position in Area4 with received signals from 3 transmitters, a calculated accuracy estimate will be $10*(10/3)^{0.5}=18$ m and a provided floor probability is $0.85^{\wedge}(10/3)=58\%$.

Figure 4:
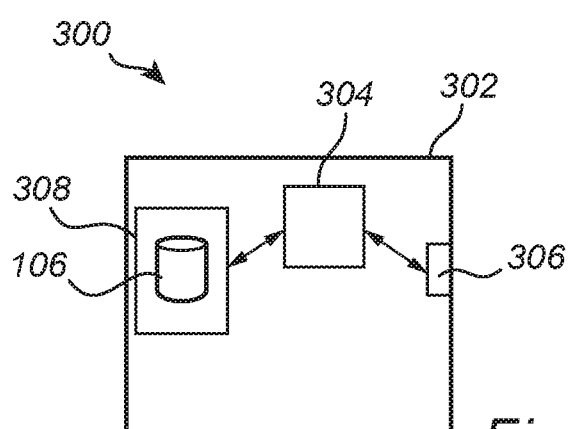
FIG. 4 is a schematic view of a device for determining an accuracy estimate according to an embodiment of the described technology.

Referring now to FIG. 4, a device 300 for estimating accuracy of a position determination will be described. The device 300 comprises a computer resource 302 having a processing unit 304 for performing computations in order to determine an accuracy estimate. The processing unit 304 may be provided with a computer program controlling the processing unit 304, such as a central processing unit (CPU), a graphics processing unit (GPU), to determine the accuracy estimate. In an alternative, an application-specific integrated circuit (ASIC) or field-programmable gate array (FPGA) may be arranged to control the determination of the accuracy estimate.

The computer resource 302 further comprises a communication unit 306 for receiving information from receiving units 105, which acquire distance-dependent measurements in relation to transmitters 102-104. The computer resource 302 may thus collect information for compiling a database 106, storing area information in relation to pre-defined geographical areas 110-116. The computer resource 302 may thus comprise a memory 308 for storing the database 106.

The communication unit 306 may also receive requests for accuracy estimates and may forward such requests to the processing unit 304.

The processing unit 304 may be arranged to determine an area affiliation based on received position information in the request, and to further determine the accuracy estimate based on the stored area information for the at least one applicable geographical area.

When the processing unit 304 has determined the accuracy estimate, it may be transmitted through the communication unit 306 in response to the received request.

It should be realized that the device 300 may for instance be a server which receives requests from receiving units 105, such as mobile phones. However, it should also be realized that the device 300 may be integrated within the receiving unit 105. For instance, the database 106, or relevant parts of the database 106, may be downloaded to the receiving unit 105. Thus, a processing unit within the receiving unit 105 may be used for determining the accuracy estimate.

The person skilled in the art realizes that the present invention by no means is limited to the preferred embodiments described above. On the contrary, many modifications and variations are possible within the scope of the appended claims.

What is claimed is:

1. A method for estimating accuracy of a position determination based on distance-dependent measurements, wherein each of said distance-dependent measurements provides distance information relating to a distance between a position of a receiving unit and a position of a transmitter, wherein the transmitter is arranged to transmit a signal which is received by the receiving unit and said distance-dependent measurement is based on the received signal, said method comprising:

storing, in a memory circuit, area information in relation to pre-defined geographical areas, wherein the area information for each pre-defined geographical area includes accuracy information relating to accuracy of position determinations based on distance-dependent measurements in the pre-defined geographical area, wherein said accuracy information comprises at least one of: a measure of an average number of transmitters detected by receiving units located in each pre-defined geographical area, and a measure of density of transmitters in each pre-defined geographical area;

receiving, with a communication circuit, a request for an accuracy estimate, said request comprising position information relating to a position of a receiving unit and transmitter information based on signals received by the receiving unit, wherein said transmitter information defines a number of transmitters from which signals are received by the receiving unit and a distance-dependent measurement based on the received signal;

determining, with a processor circuit, an area affiliation based on the received position information in said request, wherein the area affiliation defines at least one applicable geographical area among the pre-defined geographical areas, wherein the position of the receiving unit is located within the at least one applicable geographical area; and determining, with the processor circuit, the accuracy estimate based on the stored area information for the at least one applicable geographical area and on the transmitter information in the request, wherein a comparison is made between the transmitter information of the request defining the number of transmitters from which signals are received by the receiving unit and at least one of: the measure of the average number of transmitters detected by receiving units located in the pre-defined geographical area, and the measure of density of transmitters in the pre-defined geographical area.

2. The method according to claim 1, wherein said determining of the accuracy estimate comprises accessing a pre-calculated accuracy estimate for the at least one applicable geographical area.

3. The method according to claim 1, wherein said accuracy information comprises a measure of an actual positioning error in the pre-defined geographical area.

4. The method according to claim 3, wherein said determining of the accuracy estimate comprises calculating the accuracy estimate based on the stored area information for the at least one applicable geographical area.

5. The method according to claim 1, wherein said accuracy information comprises a measure of a location accuracy of transmitters in the pre-defined geographical area.

6. The method according to claim 1, wherein said accuracy information comprises attenuation information relating to attenuation of signals transmitted by transmitters in the pre-defined geographical area.

7. The method according to claim 1, wherein the area affiliation defines more than one applicable geographical area and said determining of the accuracy estimate includes determining a partial accuracy estimate for each of the more than one applicable geographical areas and selecting a smallest partial accuracy estimate as said accuracy estimate.

8. The method according to claim 1, wherein the area affiliation defines more than one applicable geographical area and said determining of the accuracy estimate includes determining a partial accuracy estimate for each of the more than one applicable geographical areas and determining said accuracy estimate as a weighted average of the partial accuracy estimates.

9. The method according to claim 1, further comprising transmitting, in response to said request, a position of the receiving unit determined based on the position information and said accuracy estimate.

10. The method according to claim 1, wherein said determining of an accuracy estimate comprises determining a horizontal accuracy estimate and a vertical accuracy estimate.

11. A computer program product comprising a non-transitory, computer-readable medium with computer-readable instructions such that when executed on a processing unit the computer program product will cause the processing unit to perform the method for estimating accuracy of a position determination based on distance-dependent measurements, wherein each of said distance-dependent measurements provides distance information relating to a distance between a position of a receiving unit and a position of a transmitter, wherein the transmitter is arranged to transmit a signal which is received by the receiving unit and said distance-dependent measurement is based on the received signal, said method comprising:
- storing area information, in a memory circuit, in relation to pre-defined geographical areas, wherein the area information for each pre-defined geographical area includes accuracy information relating to accuracy of position determinations based on distance-dependent measurements in the pre-defined geographical area, wherein said accuracy information comprises at least one of: a measure of an average number of transmitters detected by receiving units located in each pre-defined geographical area, and a measure of density of transmitters in each pre-defined geographical area;
- receiving, via a communication circuit, a request for an accuracy estimate, said request comprising position information relating to a position of a receiving unit and transmitter information based on signals received by the receiving unit, wherein said transmitter information defines a number of transmitters from which signals are received by the receiving unit and a distance-dependent measurement based on the received signal;
- determining, via the processing circuit, an area affiliation based on the received position information in said request, wherein the area affiliation defines at least one applicable geographical area among the pre-defined geographical areas, wherein the position of the receiving unit is located within the at least one applicable geographical area; and
- determining, via the processing circuit, the accuracy estimate based on the stored area information for the at least one applicable geographical area and on the transmitter information in the request, wherein a comparison is made between the transmitter information of the request defining the number of transmitters from which signals are received by the receiving unit and at least one of: the measure of the average number of transmitters detected by receiving units located in the pre-defined geographical area, and the measure of density of transmitters in the pre-defined geographical area.

12. A device for estimating accuracy of a position determination based on distance-dependent measurements, wherein each of said distance-dependent measurements provides distance information relating to a distance between a position of a receiving unit and a position of a transmitter, wherein the transmitter is arranged to transmit a signal which is received by the receiving unit and said distance-dependent measurement is based on the received signal, said device comprising:
- a memory for storing area information in relation to pre-defined geographical areas, wherein the area information for each pre-defined geographical area includes accuracy information relating to accuracy of position determinations based on distance-dependent measurements in the pre-defined geographical area, wherein said accuracy information comprises at least one of: a measure of an average number of transmitters detected by receiving units located in each pre-defined geographical area, and a measure of density of transmitters in each pre-defined geographical area; and
- a processing unit,
- said processing unit being arranged to receive a request for an accuracy estimate, said request comprising position information relating to a position of a receiving unit and transmitter information based on signals received by the receiving unit, wherein said transmitter information defines a number of transmitters from which signals are received by the receiving unit and a distance-dependent measurement based on the received signal,
- said processing unit being further arranged to determine an area affiliation based on the received position information in said request, wherein the area affiliation defines at least one applicable geographical area among the pre-defined geographical areas, wherein the position of the receiving unit is located within the at least one applicable geographical area; and
- said processing unit being further arranged to determine the accuracy estimate based on the stored area information for the at least one applicable geographical area and on the transmitter information in the request, wherein a comparison is made between the transmitter information of the request defining the number of transmitters from which signals are received by the receiving unit and at least one of: the measure of the average number of transmitters detected by receiving units located in the pre-defined geographical area, and the measure of density of transmitters in the pre-defined geographical area.

* * * * *